United States Patent
Pugh et al.

(10) Patent No.: US 7,178,143 B2
(45) Date of Patent: Feb. 13, 2007

(54) MULTI-VERSION HOSTING OF APPLICATION SERVICES

(75) Inventors: William A. Pugh, Seattle, WA (US); Brendan X MacLean, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1066 days.

(21) Appl. No.: 09/803,178

(22) Filed: Mar. 9, 2001

(65) Prior Publication Data
US 2002/0133805 A1  Sep. 19, 2002

(51) Int. Cl.
G06F 9/44 (2006.01)
G06F 12/00 (2006.01)
G06F 15/00 (2006.01)
G06F 15/173 (2006.01)

(52) U.S. Cl. ............ 717/170; 707/203; 715/511; 709/223

(58) Field of Classification Search .......... 717/170, 717/168–169, 171–178, 121; 345/619; 707/1, 707/201, 10; 719/329
See application file for complete search history.

(56) References Cited

U.S. PATENT DOCUMENTS

| | | | |
|---|---|---|---|
| 5,019,963 A * | 5/1991 | Alderson et al. ........... 707/201 |
| 5,412,808 A * | 5/1995 | Bauer ........................ 707/1 |
| 5,448,738 A * | 9/1995 | Good et al. ................. 719/329 |
| 5,475,817 A | 12/1995 | Waldo et al. |
| 5,619,716 A * | 4/1997 | Nonaka et al. ............. 717/167 |
| 5,915,112 A | 6/1999 | Boutcher |
| 5,953,532 A * | 9/1999 | Lochbaum ................... 717/176 |
| 5,986,667 A * | 11/1999 | Jevans ......................... 345/619 |
| 6,026,404 A * | 2/2000 | Adunuthula et al. ........... 707/10 |
| 6,035,423 A | 3/2000 | Hodges et al. |
| 6,080,207 A | 6/2000 | Kroening et al. |
| 6,088,803 A | 7/2000 | Tso et al. |
| 6,094,679 A | 7/2000 | Teng et al. |
| 6,185,734 B1 | 2/2001 | Saboff et al. |
| 6,188,995 B1 | 2/2001 | Garst et al. |
| 6,272,677 B1 | 8/2001 | Lam et al. |
| 6,332,168 B1 | 12/2001 | House et al. |
| 6,381,742 B2 * | 4/2002 | Forbes et al. ................. 717/176 |
| 6,442,754 B1 * | 8/2002 | Curtis .......................... 717/175 |
| 6,564,369 B1 * | 5/2003 | Hove et al. .................. 717/121 |

* cited by examiner

*Primary Examiner*—Antony Nguyen-Ba
(74) *Attorney, Agent, or Firm*—Schwabe, Williamson & Wyatt, P.C.

(57) ABSTRACT

An application service provision apparatus is provided with one or more components to perform a dispatching and a shared resource monitoring function to allow applications be hosted with multiple versions of a hosting service runtime library in a more efficient manner. The dispatching function, upon receipt of a request for service for an application, determines if the version of the runtime library required is known. If not, the dispatching function turns to the latest version of the runtime library to determine the version required. In one embodiment, the required earlier versions are loaded only on an as needed basis. The shared resource monitoring function, upon detecting aggregated allocation of a shared resource reaching a pre-determined threshold, requests consumers of the shared resource to provide tracked last used times of their allocations. In response, the monitoring function selects a number of the allocations for release, and instructed the shared resource consumers accordingly.

27 Claims, 5 Drawing Sheets

300

| Application<br>~ 312 | Runtime Version<br>~ 314 | Time Last Used<br>~ 316 |
|---|---|---|
| | | |
| | | |
| | | |

| Runtime Version<br>~ 406 | Memory Req ID<br>~ 402 | Time Last Used<br>~ 404 | |
|---|---|---|---|
| | | | |
| | | | |
| | | | |

Figure 4

MULTI-VERSION HOSTING OF APPLICATION SERVICES

BACKGROUND OF THE INVENTION

1. Field of the Invention

The present invention relates to the field of hosting application services. More specifically, the present invention relates to the issue of concurrently hosting application services with multiple versions of the hosting services.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn the local area networks are interconnected together through wide area networks, such as ATM networks, Frame Relays, and the like. Of particular notoriety is the TCP/IP based global inter-networks, the Internet.

As a result this trend of increased connectivity, increasing number of applications that are network dependent are being deployed. Examples of these network dependent applications include but are not limited to, email, net-based telephony, world wide web and various types of e-commerce. Further, increasing number of software applications that were traditionally licensed or distributed through discrete distribution medium, such as diskettes, CDROMs and the like, are being distributed online or offered as web based applications, through private intranets or public networks like the Internet.

The increased popularity of network based applications and offering of traditional software applications as application services have in turn led to the emergence of application service providers who host application services for their developers, to relieve the developers from having to maintain and operate the underlying infrastructure. To differentiate from one another, application service providers may offer hosting services or hosting runtime supports that offer functionality, usability or performance improvements over their competitors.

Thus, just like any traditional system and subsystem software developers, application service providers have a need to continually upgrade and enhance their hosting runtime services. Likewise, just like any traditional system and subsystem software, the upgrades and enhancements could have significant impact on the application services they host or support. In fact, the impact of upgrades or enhancements to the hosting service runtime support potentially could be more profound than traditional system or subsystem software. In the case of traditional system/subsystem software, generally not all licensees upgrade their system at the same time. As a result, they tend to impact the earlier adopters only. However, in the case of application service providers, once the upgrades or enhancements are promoted, all hosted application services (and their millions of users) are immediately impacted. Thus, it is desirable for application service providers to provide concurrent support for multiple versions of its hosting services or runtime support to allow gradual adoption of the new versions by the hosted application services.

However, offering concurrent support of multiple versions is not simply a matter of making the various versions available. Preferably, the concurrent support is provided in a transparent manner to the hosted applications, automatically employing the appropriate version of hosting services/runtime support. Further, as time goes on, the multiplicity of versions would inevitably become a significant burden to the application service providers, and resources become inefficiently utilized. For example, only a handful of infrequently used application services may still require the earlier versions of the runtime services. Thus, to treat all versions equally, in terms of initialization, resource allocations and like, would be extremely costly and inefficient.

Accordingly, a new approach to hosting application services, and operating the resources of an application service provision apparatus to facilitate multi-version hosting of application services is needed.

SUMMARY OF THE INVENTION

An application service provision apparatus is provided with one or more components to perform a dispatching and a shared resource monitoring function to allow applications be hosted with multiple versions of a hosting service runtime library in a more efficient manner. The dispatching function, upon receipt of a request for service for an application, determines if the version of the runtime library required is known. If not, the dispatching function turns to the latest version of the runtime library to determine the version required. In one embodiment, the required earlier versions are loaded only on an as needed basis. The shared resource monitoring function, upon detecting aggregated allocation of a shared resource reaching a pre-determined threshold, requests consumers of the shared resource to provide tracked last used times of their allocations. In response, the monitoring function selects a number of the allocations for release, and instructs the shared resource consumers accordingly.

In one embodiment, the dispatching and shared resource monitoring functions are implemented as separate components. In alternate embodiments, they are implemented as one component.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates a data structure suitable for use by the dispatching function of FIG. 1 to track the required version of the runtime library, in accordance with one embodiment;

FIG. 4 illustrates a data structure suitable for use by the shared resource monitoring function of FIG. 1 to track the last used time of shared resource allocations, in accordance with one embodiment;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, accepting, determining, inquiring, notifying, caching, routing, loading, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
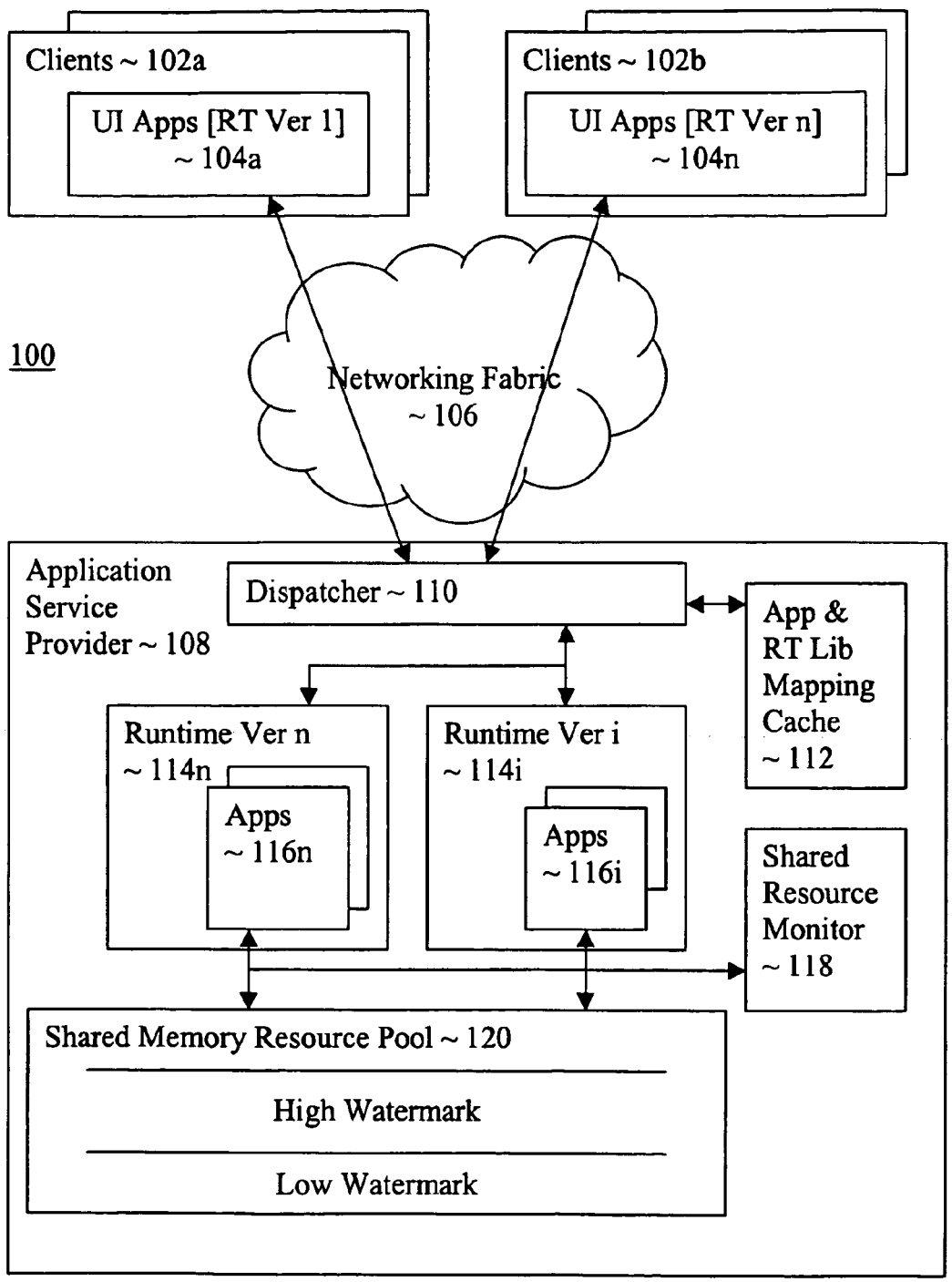
FIG. 1 illustrates an overview of the present invention, including an application service provision apparatus having one or more components to perform a dispatching and a shared resource monitoring function, in accordance with one embodiment.

Referring now to FIG. 1, wherein a block diagram illustrating an overview of the present invention, including an application service provision apparatus equipped with a dispatching and a shared resource monitoring function, in accordance with one embodiment, is shown. As illustrated, application service provision apparatus 108 hosts a number of application services, e.g. 116*i* and 116*n*, on behalf of their developers. Apparatus 108, enabled by features of the present invention, is advantageously equipped with different versions of runtime support, also referred to as the runtime library, e.g. 114*i* and 114*n*. The different hosted application services, for stability and/or other reasons, "require" these different versions of the runtime library. For example, application services 116*n* (perhaps because of certain new features offered) require the latest version 114*n* of the runtime library, while application services 116*i* (perhaps because of backward compatibility reasons) "require" an earlier version 114*i* of the runtime library. Clients 102*a* and 102*b* access these various application services, e.g. 116*i* and 116*n* (hereinafter, simply 116*), through networking fabric 106, using various known messaging protocols (e.g. HTTP) signaled in accordance with various known communication protocols (e.g. TCP/IP).

In addition to the hosted application services 116* and the various versions of the runtime library, e.g. 114*i* and 114*n* (hereinafter, also simply 114*), apparatus 108 also includes one or more resources shared by the application services 116* and/or the functions of the runtime library 114*, e.g. memory resource 120. Further, in accordance with the present invention, apparatus 108 is provided with dispatcher function 110, and shared resource monitor function 118 to facilitate the current support of the multiple versions of runtime library, and efficient operation of the resources. Moreover, for the embodiment, dispatcher function 110 also has an associated application and runtime (RT) library version mapping cache 112.

More specifically, dispatcher function 110 is employed to perform the dispatching function, i.e. routing of requests for service from clients 102*a*–102*b* to selected ones of the application services hosted. As will be described in more details below, in one embodiment, dispatcher function 110 advantageously performs the dispatching or routing in a manner that allows the earlier versions of runtime library 114* to be loaded on an as needed basis, thereby enabling apparatus 108 to support the multiple version as well as operate more efficiently. Monitor function 118 is employed to perform a monitoring function to allow resources such as memory resource 120 to be shared among application services 116* hosted and/or the functions of runtime library 114* (collectively also referred to as resource consumers at times, when convenient to do so). Accordingly, these elements together enable apparatus 108 to operate more efficiently, and in turn practically provide multi-version support.

Except for the provision of dispatcher function 110, its associated mapping cache 112, and monitor function 118 to facilitate efficient operation of apparatus 108, apparatus 108 including its runtime library 114*, application services 116*, client 102*a*/102*b* and networking fabric 106 are all intended to represent a broad range of such elements known in the art. In particular, examples of these application services include but are not limited to email applications, e-commerce applications, word processing applications, spreadsheet applications, and so forth, and clients 102*a*–102*b* may be wireless or wireline based computing devices of various form factors, including but are not limited to palm sized, notebook sized or desktop sized. Moreover, the present invention contemplates that apparatus 108 may be implemented using one or more computer servers interconnected in any one of a number of known coupling techniques, including but are not limited to dedicated channels, local area networks or wide area networks. Examples of runtime library functions include but are not limited to security functions, script functions, database access functions, and so forth. Accordingly, these elements, i.e. elements 108, 114*, 116*, 120, 102*a*/102*b* and 106, will not be further described. Dispatcher function 110, including its associated mapping cache 112, and monitor function 118 will be described in turn below.

However, before describing these elements in further detail, it should be noted that while for ease of understanding, only a handful of application services 116*, a handful of runtime library versions 114* and a handful of clients 102*a*/102*b* are shown in FIG. 1, from the description to follow, it will be readily apparent to those skilled in the art that the present invention may be practiced with many more (as well as less) application services 116*, runtime library versions 114*, and clients 102*a*/102*b*. Further, while for ease of understanding, dispatcher function 110 and monitor function 118 are described as separate functions, they may be implemented as one or more components.

Dispatcher Function

Figure 2:
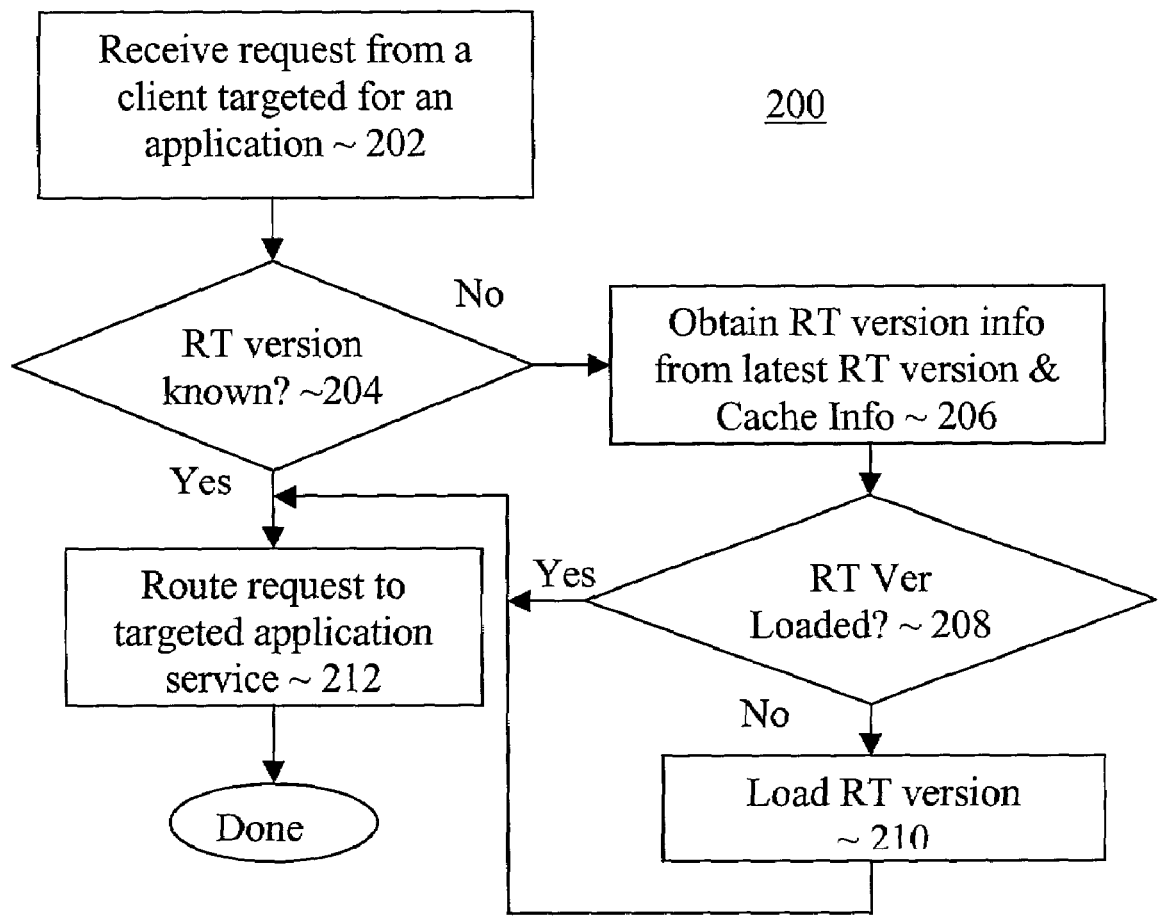
FIG. 2 illustrates the operational flow of the relevant aspects of the dispatching function of FIG. 1, in accordance with one embodiment.

Referring now to FIG. 2, wherein a flow diagram illustrating the relevant aspects of the operation flow of dispatcher function 110, in accordance with one embodiment, is shown. The embodiment contemplates that at start up (i.e. power on/reset), for perhaps efficiency reason, only the latest version of the application service hosting runtime library 114n is loaded. Moreover, the latest version includes a dynamically callable function that upon invocation, returns the required version of runtime library 114* for a particular application service hosted. As illustrated, the operation process starts with dispatcher function 110 receiving a request for service targeted for a hosted application service from a client, block 202. Upon receiving such a request, dispatcher function 110 determines if the version of the runtime library required by the targeted application service is known to itself, block 204. If the version of the runtime library required by the targeted application service is not known to dispatcher 110, it invokes the earlier described dynamically callable function of the latest version of the runtime library to obtain the version of the runtime library required by the targeted application service, block 206. Upon obtaining the information, for the embodiment, dispatcher function 110 also caches the information in the earlier described mapping cache, thus making the information available for subsequent requests targeting the same application service (until the cache line holding the information is selected for use to cache the required version information of another application service hosted). [See FIG. 3 for an example of a data structure suitable for use as a cache for caching the required version information for the various application services hosted. An example of a suitable cache line replacement scheme is a least recently used (LRU) scheme.]

Additionally, upon learning of the required version, dispatcher function 110 determines if the required version has been loaded, block 208. If the required version of the runtime library has not been loaded (e.g. the required version is an earlier version, and it has not been required by any of the targeted application services of prior requests), dispatcher function 110 loads the required earlier version of the runtime library on demand, block 210. In alternate embodiments, the present invention may be practiced with some or all of the executable code/libraries of the one or more of the earlier versions also pre-loaded.

Upon determining that the required version is known to itself (i.e. the required version information is cached in mapping cache, implying that it has previously been requested, accordingly loaded) (block 204), or determining that the required version is not known but loaded (e.g. due to cache line replacement) (block 208) or for some embodiments, loading the required version (e.g. being required for the first time) (block 210), dispatcher function 110 routes the request for service to the targeted application service (which will be properly supported, as the required version of the runtime library is now loaded).

Thus, it can be seen from the above description, the required version of a runtime library may be determined. Further, for various embodiments, earlier versions of runtime library 114* are loaded only on an as needed basis, i.e. when required by an application service targeted by a request for service received from a client. Accordingly, apparatus 108 may operate more efficiently, while allowing for multi-version hosting runtime support.

Monitor Function

Figure 5:
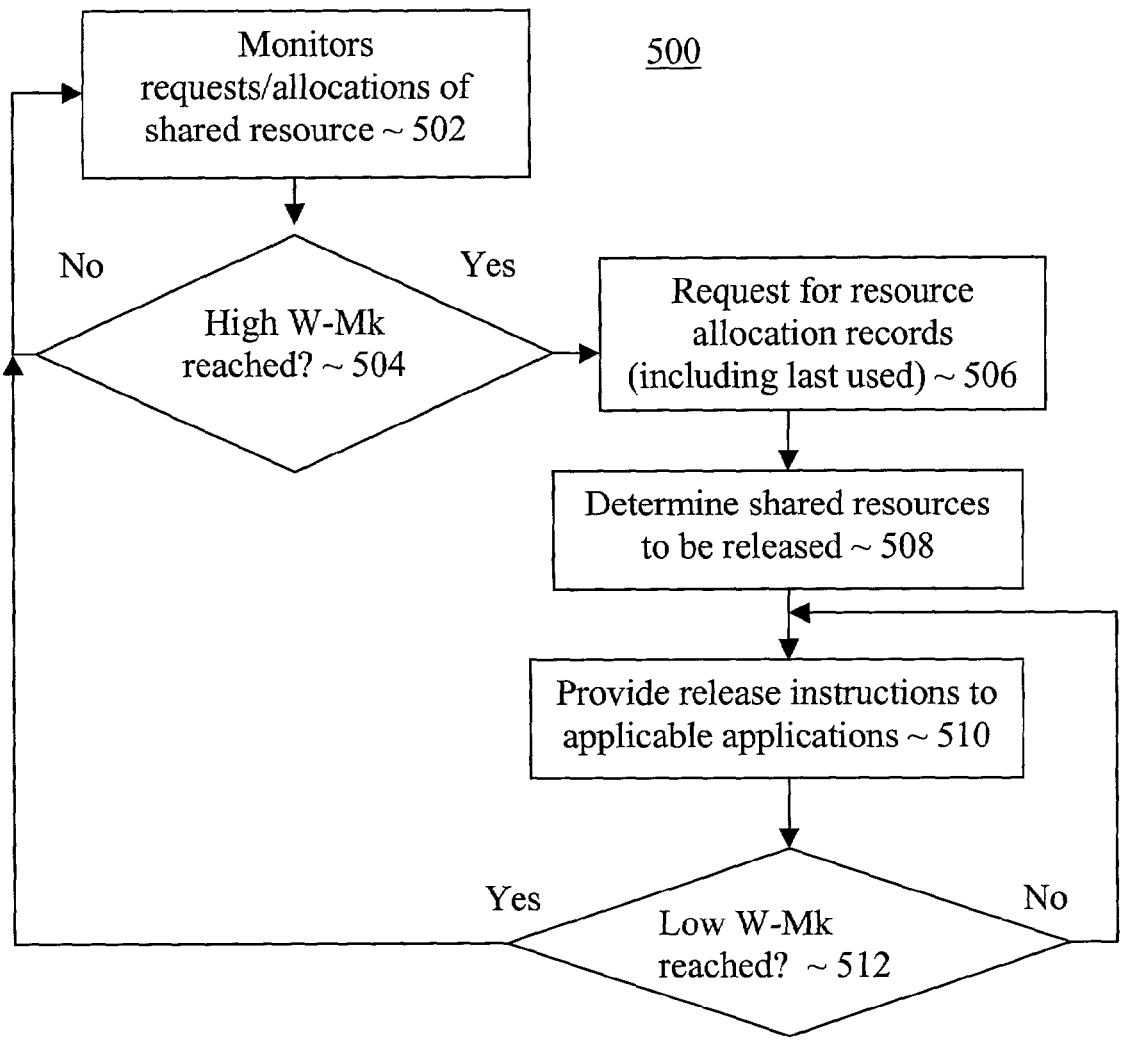
FIG. 5 illustrates the operational flow of the relevant aspects of the shared resource monitoring function of FIG. 1, in accordance with one embodiment.

Referring now to FIG. 5, wherein a flow diagram illustrating the relevant aspects of the operation flow of monitor function 118, in accordance with one embodiment, is shown. As described earlier, monitor function 118 is employed to facilitate the sharing of certain resources, e.g. memory resource 120, among the resource consumers, i.e. the application services hosted and/or the functions of the various versions of the runtime library. The embodiment contemplates that various portions of shared memory resource 120 are allocated to the resource consumers on an as needed basis. Moreover, the allocation and the de-allocation requests are routed through monitor function 118. Further, the various resource consumers keep track of the usage of the various portions of shared memory resource 120 allocated. In particular, they keep track of the addresses and sizes of the allocations, as well as the time of last usage of each of the allocated portions of shared memory resource 120. An example data structure suitable for use to track such information is shown in FIG. 4.

As illustrated, upon initialization, monitor function 118 monitors the requests and/or allocations of the shared resource, block 502. It further continually determines if the aggregated allocation, i.e. the total current cumulative allocation, has reached a pre-determined threshold, also referred to as the "high watermark", block 504. As described earlier, all allocation requests are routed through monitor function 118, which maintains a counter to keep track of the current level of aggregated allocation. If the high watermark has not been reached, monitor function 118 simply continues operation back at block 502, and repeats the operation of block 504, until eventually it is determined that the aggregated allocation of shared memory resource 120 has reached the predetermined high watermark.

At such time, monitor function 118 requests the resource consumers (more specifically, those who received allocations) to provide it with the usage records of the allocated resources, block 506. Of particular interest to be provided, is the time of last use of these allocations by the corresponding recipient entities.

Upon receipt of these information from the resource consumers, monitor function 118 determines the allocated shared memory resources to be released to bring the aggregated allocation back to at most another predetermined threshold, referred to as the low watermark, block 510. Upon making the determination, monitor function 118 instructs the resource consumers to release the selected resource portions accordingly.

In one embodiment, monitor function 118 makes the determination by merging and ordering the usage information received from the resource consumers. From the merged ordered set of the usage information, monitor function 118 "speculatively" selects a number of the least recently used allocations for release to attempt to bring the aggregated allocation back down to the low watermark.

Upon instructing the resource consumers, monitor function 118 continues its operation at block 512, determining if the instructions were sufficient to bring the total consumption of the shared resource down to the low watermark. As the instructed resource consumers begin to free previously allocated portions of the shared resource as instructed, monitor function 118 decrements the running counter it maintains for the amount of shared resources having been allocated. If the instructed de-allocations were able to bring the aggregated allocation back down to the low watermark monitor function 118 repeats the operation of block 510. In alternate embodiments, the entire sequence of operations of blocks 506-510 may be repeated instead. If the action or successive actions were successful in bringing the aggregated allocation back down to the low watermark, monitor function 118 continues its operation at block 502. Thus, memory resource 120 may be efficiently shared among the resource consumers, i.e. the hosted application services and the functions of the various versions of the runtime library.

As those skilled in the art would appreciate, other resources, such as data channels, may also be shared in like manner, under the control of monitor function 118 or a similar coordinator function, thereby allowing apparatus 108 to operate more efficiently.

Example Computer System

Figure 6:
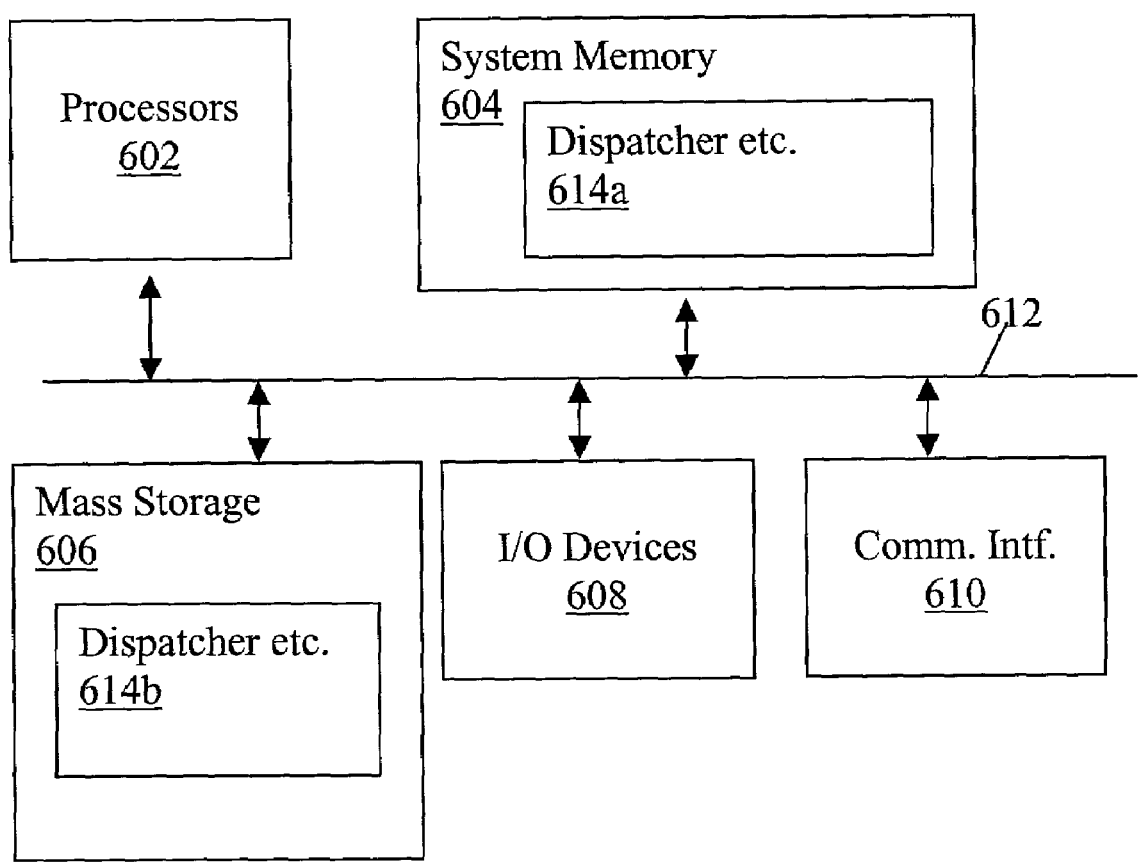
FIG. 6 illustrates an internal component view of a computer system suitable for use to practice the present invention, in accordance with one embodiment.

FIG. 6 illustrates an example computer system suitable for use as a server for implementing application service provision apparatus 108 (or a portion thereof), in accordance with one embodiment. As shown, computer system 600 includes one or more processors 602 and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the dispatcher and monitor functions of the present invention. The permanent copy of the programming instructions may be loaded into mass storage 606 in the factory, or in the field, as described earlier, through a distribution medium (not shown) or through communication interface 610 (from a distribution server (not shown). The constitution of these elements 602-612 are known, and accordingly will not be further described.

Conclusion and Epilog

Thus, an improved method and apparatus for hosting application services with multiple versions of the hosting runtime services has been described. While the present invention has been described in terms of the above illustrated embodiments, those skilled in the art will recognize that the invention is not limited to the embodiments described. The present invention can be practiced with modification and alteration within the spirit and scope of the appended claims. For example, the resolution of the appropriate version of the hosting services may be performed by a version other than the "latest" version (e.g. when the "latest" version is a "beta" version), as well as by other means independent of the individual versions themselves. Thus, the description is to be regarded as illustrative instead of restrictive on the present invention.

What is claimed is:

1. In an application service provision apparatus having an application service provision runtime library with multiple versions, a method of operation comprising:

loading the latest version of the runtime library at initialization of the application service provision apparatus, the latest version of the runtime library includes data associating an application with a required version of the runtime library;

during operation, receiving by a dispatcher a request for service for the application;

in response, determining by the dispatcher whether the required version of the runtime library used by the application is known to the dispatcher; and if the version of the runtime library required by the application is not known to the dispatcher, inquiring by the dispatcher of the latest version of the runtime library to learn of the required version of the runtime library.

2. The method of claim 1, wherein said method farther comprises the latest version of the runtime library informing the dispatcher which version of the runtime library is the required version of the runtime library, and the dispatcher caching the required version information.

3. The method of claim 2, wherein said method further comprises the dispatcher routing the request of service to the application to handle if the dispatcher is informed by the latest version of the runtime library that the required version of the runtime library is the latest version itself.

4. The method of claim 2, wherein said method further comprises the dispatcher determining whether the required version of the runtime library is loaded if the required version is an earlier version of the runtime library and, if the required earlier version of the runtime library is not loaded, loading the required earlier version.

5. The method of claim 4, wherein said method further comprises the dispatcher routing the request of service to the application to handle if the required earlier version of the runtime library is already loaded or upon loading the required earlier version of the runtime library.

6. The method of claim 1, wherein said method further comprises the dispatcher routing the request for service to the application to handle if the required version of the runtime library is known to the dispatcher.

7. An apparatus comprising:

storage medium having stored therein programming instructions designed to implement a dispatcher on the apparatus to:

load a pre-determined version of a runtime library with multiple versions at initialization of the apparatus, the pre-determined version being the latest version, receive a request for service for an application during operation, determine, in response, whether the version of the runtime library required by the application is known to the dispatcher, and inquire with the latest version of the runtime library to learn of the required version of the runtime library if the version of the runtime library required by the application is not known to the dispatcher; and at least one processor coupled to the storage medium to execute the programming instructions.

8. The apparatus of claim 7, wherein the dispatcher implemented by the programming instructions is farther designed to receive from the latest version of the runtime library information on the required version of the runtime library, and in turn, cache the required version information.

9. The apparatus of claim 8, wherein the dispatcher implemented by the programming instructions is further designed to route the request of service to the application to handle if the dispatcher is informed by the latest version of the runtime library that the required version of the runtime library is the latest version itself.

10. The apparatus of claim 8, wherein the dispatcher implemented by the programming instructions is further designed to determine whether the required version of the runtime library is loaded if the required version is an earlier version of the runtime library, and if the required earlier version of the runtime library is not loaded, load the required earlier version.

11. The apparatus of claim 10, wherein the dispatcher implemented by the programming instructions is further designed to route the request of service to the application to handle if the required earlier version of the runtime library is already loaded or upon loading the required earlier version of the runtime library.

12. The apparatus of claim 7, wherein the dispatcher implemented by the programming instructions is further designed to route the request for service to the application to handle if the required version of the runtime library is known to the dispatcher.

13. The apparatus of claim 7, wherein the storage medium further having stored therein programming instructions to implement the plurality of versions of the runtime library.

14. In an apparatus having a shared resource consumer, a method of operation of the shared resource consumer, comprising:
   accepting allocations of a plurality of portions of a shared resource;
   tracking points in time the allocations were last used;
   receiving a request to provide the tracked points in time;
   in response, providing the tracked points in time as requested;
   receiving instructions to release selected ones of the allocations; and
   releasing the specified allocations as instructed.

15. The method of claim 14, wherein the apparatus is an application service provision apparatus, and the shared resource consumer is an application requiring application service provision runtime library support.

16. The method of claim 14, wherein the apparatus is an application service provision apparatus, and the shared resource consumer is a function of an application service provision runtime library.

17. In an apparatus comprising a shared resource monitor, a method of operation of the shared resource monitor, comprising:
   conditionally requesting a plurality of shared resource consumers to provide corresponding tracked plurality points in time, where corresponding plurality of portions of a shared resource allocated to the plurality of shared resource consumers were last used; and
   determining which, if any, of the plurality of allocations of the portions of the shared resource are to be released by the plurality of shared resource consumers, and instructing the plurality of shared resource consumers to release selected ones of the plurality of allocations accordingly.

18. The method of claim 17, wherein said conditional request is made when aggregate allocations of the shared resource reach a pre-determined threshold.

19. The method of claim 17, wherein said determining comprises ordering said provided plurality points in time, and selecting a sufficient number of the least recently used allocations to be released to bring the aggregate allocations to at most a predetermined threshold.

20. The method of claim 17, wherein the resource monitor is a component of an application service provision apparatus.

21. An apparatus comprising:
   storage medium having stored therein a plurality of programming instructions designed to implement a shared resource consumer, including the ability to:
      accept allocations of a plurality of portions of a shared resource,
      track points in time the allocations were last used,
      receive a request to provide the tracked points in time,
      provide, in response, the tracked points in time as requested,
      receive instructions to release selected ones of the allocations, and
      release the specified allocations as instructed; and
   at least one processor coupled to the storage medium to execute the programming instructions.

22. The apparatus of claim 21, wherein the apparatus is an application service provision apparatus, and the shared resource consumer is an application requiring application service provision runtime library support.

23. The apparatus of claim 21, wherein the apparatus is an application service provision apparatus, and the shared resource consumer is a function of an application service provision runtime library.

24. An apparatus comprising:
   storage medium having stored therein a plurality of programming instructions designed to implement a shared resource monitor, including the abilities to:
      conditionally request a plurality of shared resource consumers to provide corresponding tracked plurality points in time, where corresponding plurality of portions of a shared resource allocated to the plurality of shared resource consumers were last used, and
      determine which if any of the plurality of allocations of the portions of the shared resource are to be released by the plurality of shared resource consumers, and instruct the plurality of shared resource consumers to release selected ones of the plurality of allocations accordingly; and
   at least one processor coupled to the storage medium to execute the programming instructions.

25. The apparatus of claim 24, wherein said shared resource monitor is designed to make said conditional request when aggregate allocations of the shared resource reach a pre-determined threshold.

26. The apparatus of claim 24, wherein said shared resource monitor is designed to perform said determining by ordering said provided plurality points in time, and selecting a sufficient number of the least recently used allocations to be released to bring an aggregate of the allocations to at most a predetermined threshold.

27. The apparatus of claim 24, wherein the apparatus is an application service provision apparatus, and the resource monitor is a component of said application service provision apparatus.

* * * * *

UNITED STATES PATENT AND TRADEMARK OFFICE
CERTIFICATE OF CORRECTION

PATENT NO. : 7,178,143 B2  Page 1 of 1
APPLICATION NO. : 09/803178
DATED : February 13, 2007
INVENTOR(S) : William A. Pugh and Brendan X. MacLean It is certified that error appears in the above-identified patent and that said Letters Patent is hereby corrected as shown below:

Column 2
Line 18, "...allow applications be hosted..." should read --...allow applications to be hosted...--.

Column 4
Line 15, "...in more details..." should read --...in more detail...--.
Line 46, "...but are not limited to..." should read --...but not limited to...--.

Signed and Sealed this

Nineteenth Day of June, 2007

JON W. DUDAS
*Director of the United States Patent and Trademark Office*